United States Patent [19]

Avins et al.

[11] E Patent Number: Re. 32,148

[45] Reissued Date of Patent: May 13, 1986

[54] CONTROL APPARATUS FOR A COLOR TELEVISION RECEIVER

[75] Inventors: Jack Avins, Princeton, N.J.; Loren R. Kirkwood, Indianapolis, Ind.

[73] Assignee: RCA Corporation, Princeton, N.J.

[21] Appl. No.: 762,105

[22] Filed: Jan. 24, 1977

Related U.S. Patent Documents

Reissue of:

[64] Patent No.: 3,679,816
Issued: Jul. 25, 1972
Appl. No.: 128,704
Filed: Mar. 29, 1971

[51] Int. Cl.[4] ..... H04N 9/46

[52] U.S. Cl. ..... 358/27; 358/28

[58] Field of Search ..... 358/27, 28, 10

[56] References Cited

U.S. PATENT DOCUMENTS

| | | | |
|---|---|---|---|
| 2,766,321 | 10/1956 | Parker | 358/25 |
| 3,272,915 | 9/1966 | Theriault | 358/27 |
| 3,368,030 | 2/1968 | Wiencek | 358/28 |
| 3,456,068 | 7/1969 | Wilhelmy | 358/28 |
| 3,483,316 | 12/1969 | Hickok | 358/28 |
| 3,604,844 | 9/1971 | Ross | 358/27 |
| 3,637,924 | 1/1972 | Cecchin | 358/27 |
| 3,673,320 | 6/1972 | Carnt et al. | 358/28 |
| 3,701,845 | 10/1972 | Stark et al. | 358/28 |
| 4,130,831 | 12/1978 | Isono et al. | 358/27 |

FOREIGN PATENT DOCUMENTS

| | | | |
|---|---|---|---|
| 1446471 | 6/1966 | France | 358/28 |

OTHER PUBLICATIONS

Kim, "VIR II System", *IEEE Transactions on Consumer Electronics*, vol. CE-24, No. 3, Aug. 1978, pp. 200-208.

Lewis, "Proposed Subcarrier Pilot for NTSC-type Colour Television", *Electronics and Power*, pp. 207-208, Jun. 1964.

MacDiarmid et al., "Automatic Differential Gain and Phase Correction for Long-Distance Colour Television Links", *Wireless World*, pp. 113-115, Mar. 1965.

GE Company, CA Chassis Schematic Diagram, Jan. 1966.

"Color-Television Demonstrations, London, Oct. 26th to 29th and Nov. 4th and 5th 1964", *EBU Review*, Part A-Technical, p. 296, No. 88, Dec. 1964.

Neal, "A Brief History of the VIR: Vertical Interval Reference Signal", *Communications/Engineering Digest*, pp. 20-25, Jan. 1976.

*Primary Examiner*—John W. Shepperd
*Attorney, Agent, or Firm*—Eugene M. Whitacre; William H. Meagher

[57] ABSTRACT

A color reference signal is inserted during the vertical blanking interval of a transmitted television waveform, for utilization by the described apparatus in automatically setting the hue and saturation of the display of an NTSC or a PAL receiver. The apparatus responds to the transmitted burst signal to set the frequency and phase of the sub-carrier oscillator of the receiver and, further, to the transmitted reference signal to correct any such inaccurate setting of phase as is caused by adverse conditions of networking and transmission from the studio to the receiver.

11 Claims, 3 Drawing Figures

CONTROL APPARATUS FOR A COLOR TELEVISION RECEIVER

Matter enclosed in heavy brackets [ ] appears in the original patent but forms no part of this reissue specification; matter printed in italics indicates the additions made by reissue.

FIELD OF THE INVENTION

This invention relates to color television receivers and, more particularly, to a modification of the apparatus described in [pending U.S. application Ser. No. 121,842, filed Mar. 8, 1971] *U.S. Pat. No. 3,673,320*, and entitled "TELEVISION APPARATUS RESPONSIVE TO A TRANSMITTED COLOR REFERENCE SIGNAL".

BACKGROUND OF THE INVENTION

Such [Ser. No. 121,842 application] *patent* discloses apparatus capable of utilizing a reference signal inserted in the vertical blanking interval of a transmitted television waveform to improve the consistency of reproduced color. As is therein described, tighter control of the phase of the sub-carrier oscillator of the receiver (with a resulting improvement in color demodulation) is attained by employing the transmitted color synchronizing burst signal to lock the oscillator in frequency and by additionally employing the transmitted reference signal to lock it in phase. This use of the periodically recurring burst to independently control oscillator frequency was noted as being advantageous in that it enabled the apparatus to have a speed of response and a signal-to-noise ratio comparable to those exhibited by typical NTSC frequency and phase control arrangements. There the burst signal alone is employed to set the oscillator as the reference against which the demodulation occurs.

Because the reference signal was of much longer duration than the synchronizing burst, however, its use in controlling the phase of the oscillator proved advantageous as it was substantially less subject to phase variations from such phenomena an multipath and transmission line reflection, for example. Use of the color reference signal instead of the synchronizing burst as the measure in providing automatic chroma control for saturation correction was similarly noted as being superior in that the amplitude of the reference signal was not subject to the cumulative tolerances associated with the burst signal amplitude.

SUMMARY OF THE INVENTION

As will become clear hereinafter, apparatus constructed in accordance with the present invention represents a modification of the apparatus described in the [Ser. No. 121,842 case (RCA 63,138)] *above-noted patent* in that it uses the color synchronizing burst to initially set both the frequency and the phase of the sub-carrier oscillator. Such dual use has the advantage of retaining the high speed of response which characterizes present NTSC and PAL systems of color synchronization where the apparatus rapidly locks in frequency and phase both during channel switching and during the switching of program sources for the same channel. This dual use is also advantageous in that the apparatus similarly retains the high degree of noise immunity which characterizes burst synchronization. As will be appreciated, both these advantages result from the fact that the burst information recurs at a horizontal line rate—so that over a period of one television frame approximately 1,250 microseconds of information is received—as contrasted with a suggested reference signal information of about 24 microseconds per frame. Even if such reference signal were transmitted instead at field rate, the effective signal-to-noise ratio, the speed of response and the continuity of synchronizing information exhibited would continue substantially inferior to that of the burst synchronization system proposed.

As will also become clear, however, the apparatus constructed according to the invention utilizes the color reference signal to insure that the phase of the subcarrier wave applied to the color demodulator system will be in accord with the reference signal phase, rather than with the phase of the synchronizing burst. This is important because under conditions of multipath, transmission line reflection, or in the event of differential phase errors, the phase of the burst can be significantly altered with a corresponding change in chrominance phase. Use of the burst in establishing the phase of the oscillator wave can then produce errors in the reproduced hue. Such errors can be offset, however, by selecting the reference signal to be susceptible to the same phase variations as the large area chrominance information, and by using these variations of the reference signal to adjust the phase of the sub-carrier wave which demodulates the chrominance signal.

As will be seen below, one embodiment of the invention employs a phase shifter inserted between the subcarrier oscillator of the receiver and its color demodulating system. A phase comparator is included to sense any difference between the phase of the oscillator wave and the phase of the color reference signal, and to develop a correction voltage for the phase shifter as will reduce this difference to zero. Customer adjustment of hue can be had by externally controlling the direct current correction voltage applied to the phase shift circuit. Alternatively, hue control adjustments can be accomplished by varying the phase of the oscillator drive to the color demodulators.

Another embodiment of the invention removes the need for a separate phase comparator by gating the output of one of the system's color demodulators at the time of the reference signal insertion into the vertical blanking interval, and by using any resultant signal output as the control for the oscillator phase shifter.

BRIEF DESCRIPTION OF THE DRAWINGS

These and other advantages of the invention will become more clearly understood from a consideration of the following description taken in connection with the accompanying drawings in which.

DETAILED DESCRIPTION OF THE DRAWINGS

Figure 1:
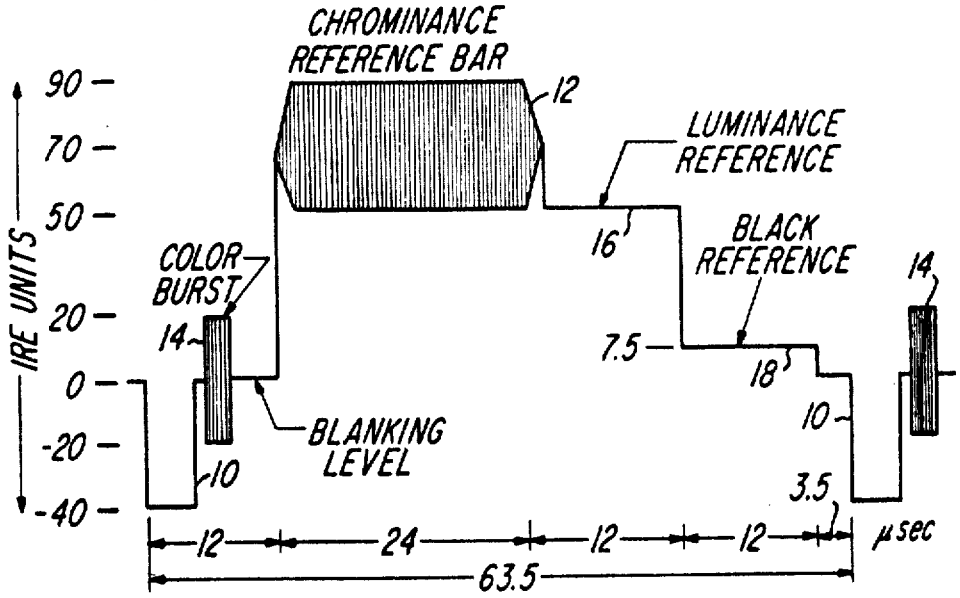
FIG. 1 illustrates a complete line within the vertical blanking interval of a transmitted television waveform, including a reference signal for improving the quality and consistency of a reproduced color television receiver display.

FIG. 1 illustrates a preferred format for the color reference signal inserted into the transmitted television waveform—for example, at line 20 of the vertical blanking interval of either (or both) television fields. Such a reference signal is of the type proposed by the Broadcast Television Systems Committee of the Electronic Industries Association for ensuring that the television signal radiated from the broadcast transmitter corresponds to the signal which was originated in the video system where the amplitude and phase of the composite signal was initially established. Because the reference signal is added to the video signal at this point where the amplitude and phase of the composite waveform are correctly set, then any change produced in the reference signal during its coupling through the studio portions of the television system would correspond to those changes which the video signal would also undergo. Observation of the reference signal in the broadcast chain, followed by any necessary adjustment to re-establish its prescribed amplitude and phase at that point, would then correspondingly adjust the chrominance, luminance and synchronizing components of the television signal to those values which were established at the point of origination.

In FIG. 1, this vertical interval signal is illustrated as containing a sub-carrier phase reference portion, a luminance reference portion and a sub-carrier amplitude reference portion. As shown, the first 24 microseconds following the back porch of the horizontal synchronizing pulse 10 constitutes a chrominance reference bar 12 consisting of a chrominance sub-carrier of the same phase as the color synchronizing burst 14,-(B-Y). The purpose of the phase reference is to allow the phase of the color burst to be corrected if necessary, to agree with the phase of the chrominance reference bar—which, because of its substantially longer duration, is not affected as much by the vagaries of the transmission paths at the broadcast studio.

Following the 24 microsecond chrominance bar 12, is a 12 microsecond luminance reference 16 to 50 IRE units amplitude, and a further black level reference 18 of 12 microseconds duration at 7.5 IRE units amplitude. The purpose of these two levels is to allow the correct adjustment of luminance amplitudes and, if necessary, the amplitude of the synchronizing pulse peak. After the luminance amplitude has been correctly adjusted, the chrominance bar 12 should have an amplitude of 40 IRE units peak-to-peak, set on a pedestal of 70 IRE units. This then permits a comparison to be made with the amplitude of the chrominance subcarrier and of the color burst, and simplifies any additional adjustments that may be necessary.

Such vertical interval reference signal (VIR) is more fully described in the BTS Committee Report, the disclosure of which is herein incorporated by reference. In passing, however, it should be noted that corrective action to adjust the video signal can be done at a stabilizing ampalifier, for example, through which the video signal passes by a (a) adjusting the VIR black level reference to 7.5 IRE units, (b) adjusting the luminance reference to 50 IRE units, (c) adjusting the horizontal synchronizing peaks to −40 IRE units, (d) adjusting the chrominance gain so that the amplitude of the chrominance reference bar is 40 IRE units peak-to-peak, (e) adjusting the amplitude of the color burst to 40 IRE units peak-to-peak, and (f) adjusting the phase of color burst to be the same as the chrominance reference bar.

Since one purpose of this vertical interval signal is to enable the broadcaster to maintain the color synchronizing bursts accurately in phase with the reference signal as radiated, it would appear that no further action need be taken at the receiver to provide the desired accuracy of color synchronization other than to demodulate the burst in a conventional manner. Under normal conditions this would be true—but, under conditions of multipath, transmission line reflection, or in the event of differential phase errors, the phase of the burst could be altered without a corresponding change in the phase of the chrominance signal, and produce errors in the hue of a reproduced image. To overcome this limitation, the instant invention adds to the advantages such reference signal presents to the broadcast transmission, the further usage of that signal at the receiver to insure that the phase of the oscillatory signal applied to the color demodulating system will be in accord with the reference signal phase rather than with the burst signal which, as noted above, can be in error because of these transmission characteristics.

Figure 2:
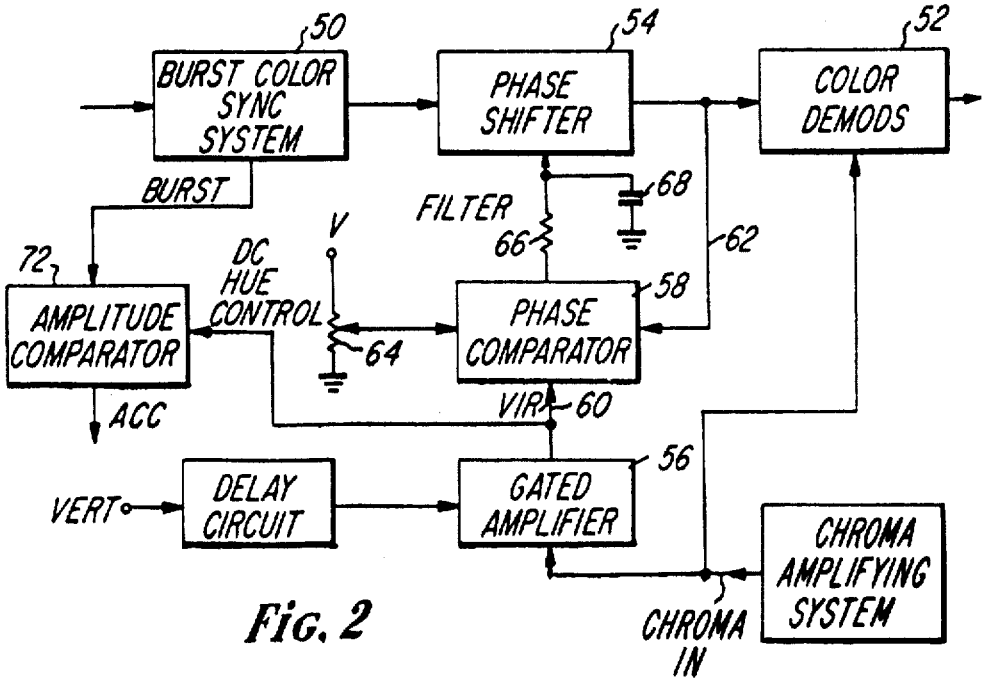
FIG. 2 illustrates, by way of a block diagram, apparatus embodying the present invention and responsive to such reference signal for achieving automatic hue correction in the receiver.

In FIG. 2, a burst color synchronization system 50 is shown coupled to the color demodulator units of the receiver 52 through a phase shift circuit 54. Each of these units may be of conventional design, with the synchronization system 50 including the sub-carrier reference oscillator set in both frequency and phase by the recovered synchronizing burst, as in conventional NTSC constructions. The color demodulators 52 may also be of conventional construction, producing (R-Y) and (B-Y) color difference signals, for example. As such, the synchronization system 50 may generally include the burst separator and sub-carrier oscillator of the receiver, together with any automatic frequency and phase control network that might be employed, while the color demodulator units 52 may be coupled to any appropriate matrix arrangement whereby the recovered luminance component might be added to provide the red, green and blue video signals for the color kinescope.

Also shown in FIG. 2 is a gated amplifier 56 and a phase comparator 58. To a first input of the amplifier 56 is applied the chrominance signal obtained from within the chroma amplifying system of the receiver, with that signal including the VIR reference during a predetermined portion of the vertical blanking interval of the composite waveform. A second input to the amplifier 56 applie a grating pulse obtained by a delay circuit counting down from a vertical synchronizing rate pulse trigger to that line of the vertical blanking interval in which the reference signal is inserted. The VIR reference signal gated out from the amplifier 56 in response is applied via the connection 60 to a first input of the phase comparator 58, while the output of the reference oscillator coupled through the phase shifter 54 is applied to a second input of the comparator 58 via the connection 62. It will be understood that the pulse shifter 54 may exhibit a nominal phase shift of 0° in the normal operation of the apparatus of FIG. 2 so that, initially, the phase of the demodulating signal applied by the phase shifter 54 to the color demodulators 52 is the same as the phase of the oscillatory signal applied by synchronizing system 50 to the phase shifter 54.

Neglecting the hue control potentiometer 64 coupled to a third input of the phase comparator 58, it will be appreciated that in the absence of the reference signal input to comparator 58, the apparatus of FIG. 2 will operate in the usual NTSC burst synchronizing manner. In the presence of the reference signal input, on the other hand, any phase difference existing between the oscillatory signal at the output of phase shifter 54 and the reference signal coupled from amplifier 56 will cause the comparator 58 to produce an output voltage representative of the phase difference. This control voltage is coupled via a relatively long integration time constant circuit (including resistor 66 and capacitor 68, for example) to adjust the phase shifter 54 to reduce this phase difference towards zero—with the integration characteristic being chosen so as not to degrade the signal-to-noise ratio of the oscillatory signal. In this respect, the phase shifter 54, the comparator 58, the connection 62, and the filter 66, 68 form a closed loop network which functions to adjust the phase of the demodulating signal until its phase coincides with the phases of the VIR reference signal.

Whereas, this closed loop network permits an automatic correction of reproduced hue for changes in transmission characteristic, use of the hue control potentiometer 64 permits a manual correction to be made in accordance with individual viewing preference. In particular, the control 64 coupled to the third input of the phase comparator 58 enables a modification to be made in the direct current balance point of the comparator.

In this manner, the apparatus of FIG. 2 utilizes the transmitted color synchronizing burst to set the frequency and phase of the sub-carrier oscillator, and additionally responds to the transmitted reference signal to correct any inaccuracy in the oscillator phase setting which may result from the vagaries of signal transmission from the broadcast antenna to the home receiver and which would adversely affect the phase of the oscillatory signal applied to demodulate the chrominance signal coupled to the color demodulating system 52.

As will be noted, the apparatus disclosed in FIG. 2 provides the additional advantage that its operation will continue even where the reference signal information is absent. In such instance, no error signal output would be produced by the phase comparator 58, and no incremental phase shift would thus be introduced.

Figure 3:
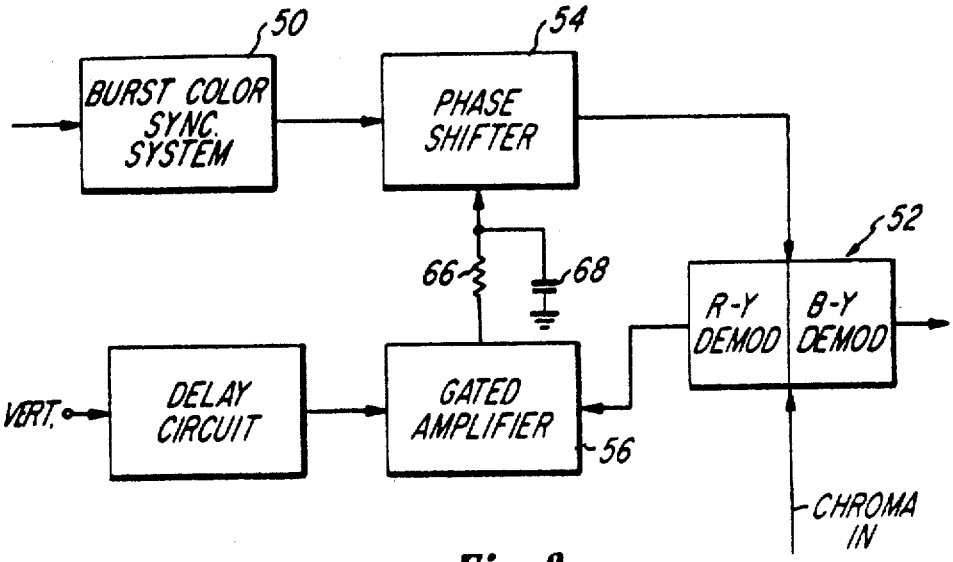
FIG. 3 illustrates, also by way of a block diagram, a modification of the apparatus of FIG. 2, according to the invention.

The arrangement of FIG. 3 shows a modification of the apparatus of FIG. 2 in its elimination of the phase comparator 58. With a VIR signal having a chrominance reference bar of —(B-Y) phase (12, in FIG. 1), for example, the output of the R-Y demodulator can be sensed during the vertical blanking time where the color reference signal is inserted, and the resulting output then used as the control signal for the phase shift circuit 54. Thus, the gated amplifier 56 of FIG. 2 can be modified to accept the output of the R-Y demodulator of the demodulating system 52 and to apply an output voltage via the integration circuit 66, 68 to the phase shifter 54 to adjust the phase of the demodulating signal in the direction to reduce the R-Y output towards zero. For a color reference bar phase of —(R-Y), on the other hand, the amplifier unit 56 can be connected to sense the output of the B-Y demodulator of the system 52, with the arrangement then being constructed to adjust the demodulating signal phase to reduce the output of the B-Y demodulator towards zero.

As was also described in the [Ser. No. 121,842 application,] *above-noted patent* a color reference signal inserted in the vertical blanking interval may additionally contain amplitude information which can be utilized at the receiver to automatically correct the saturation of its reproduced display under conditions where the amplitude of the synchronizing burst does not accurately represent the correct relative amplitude of the chrominance signal. As there pointed out, this inaccurate representation may be due to an incorrect burst amplitude setting at the signal source, to differential amplitude distortion in networking and transmission, to multipath, to antenna transmission line reflections, etc. Under such adverse conditions, a color reference signal would be more representative of the proper relative amplitude of the chrominance signal since it will undergo the same types of distortion as will the chrominance signal itself.

However, use of the reference signal information alone in providing a primary source of automatic chroma control voltage (ACC) for the correction may exhibit the disadvantage that the speed of the offered correction is relatively slow because the reference signal is transmitted at the slower field or frame rate. In accordance with the present invention, on the other hand, such correction can be improved by using the burst amplitude in obtaining the prime source of ACC voltage, and using the amplitude of the reference signal to adjust the control in much the same way that the reference phase was used to adjust the demodulating signal phase in FIG. 2. Thus, whereas the phase of the demodulating signal was first set by the phase of the color synchronizing burst in FIG. 2 and then corrected at a slower rate by the phase of the color reference bar, so too may the amplitude of the ACC voltage be first set by the amplitude of the color burst and any needed adjustment be done by the slower rate reference signal amplitude. Such adjustment will follow the use—in FIG. 2, for example—of an amplitude comparator 72, which provides an output correction voltage whenever there exists a difference between the amplitude of the recovered synchronizing burst (applied to a first of its input terminals from the synchronizing system 50) and the amplitude of the recovered reference signal (applied to a second of its input terminals from the gated amplifier 56).

While there have been described what are considered to be preferred embodiments of the present invention, it will be readily apparent that modifications may be made without departing from the spirit and scope of the instant disclosure. Thus, while the color reference signal has been described as being of the BTS Committee format, it will be recognized that other type signals—such as the type described in the aforenoted Ser. No. 121,842 application—might be used as well, and still utilize the teachings herein. Similarly, while the color reference bar 12 of FIG. 1 has been described as being of —(R-Y) phase for the BTS format, it will be appreciated that with only minor modifications to the apparatus connections, a phase of —(R-Y) phase will also be applicable.

It will also be noted that the gating apparatus described herein in comparing the phase of the oscillator signal with the phase of the VIR reference or in sensing the output of one of the color demodulators at the time of reference signal insertion in the vertical blanking waveform is far simpler than the approach suggested by U.S. Pat. No. 3,456,068—Wilhelmy. Besides further representing an improvement over the apparatus of that patent in providing for automatic saturation control in addition to hue control, the construction of the present invention offers its correction features with a higher signal-to-noise ratio than is there present, by virtue of its use of a reference signal of substantially longer duration. Utilization of such reference signal to occupy almost an entire line interval in the vertical blanking waveform—rather than just at the end of a horizontal scanning line as in U.S. Pat. No. 3,456,068—also offers the advantage that phase shifts caused by adverse transmission characteristics are much less severe and, therefore, easier to work with.

What is claimed is:

1. In a color television receiver adapted to receive a television signal including a luminance component, a chrominance component modulated in both phase and amplitude, periodically recurring color synchronizing bursts occupying prescribed intervals during the horizontal retrace portions of said signal and a color reference signal occupying a prescribed interval during the vertical retrace portion of said television signal and being of substantially longer duration than said color synchronizing bursts, apparatus comprising:

first means for providing an oscillatory signal to demodulate said chrominance component [and produce color difference signals containing information proportional to the hue and saturation of the televised scene], said means being responsive to the television signal for recovering the color synchronizing bursts thereof and for utilizing said bursts to lock the frequency of the oscillatory signal to the frequency of such bursts and to lock the phase of the oscillatory signal to the phase of said bursts;

*second means, including at least first and second chrominance demodulators responsive to said oscillatory signal, and also responsive to said television signal, for demodulating said chrominance component and producing color difference signal outputs representative of the hue and saturation of the televised scene;*

[second] *third* means, also responsive to said television signal, for recovering said longer duration color reference signal and for utilizing said signal in developing a control signal to adjust the phase of said oscillatory signal as a function of the phase of said reference signal; [and]

[third] *fourth* means responsive to said oscillatory signal and to said control signal for varying the phase of said oscillatory signal in a direction to correspond with the phase of said reference signal as represented by said control signal, *said fourth means comprising a variable phase shifter, external to said first means, and interposed between an output of said first means and said demodulators;* whereby the degree of error in the hue of a reproduced color image attributable to such transmission characteristics as multipath, transmission line reflection and the like is correspondingly reduced

*said apparatus also including fifth means for coupling the chrominance component of said television signal to said demodulators for demodulation with said phase-adjusted oscillatory signal to produce said color difference signals; and*

*sixth means responsive to said longer duration color reference signal and said color synchronizing bursts for varying the gain of said fifth means as a function of the amplitudes of said bursts and said reference signal.*

[2. The apparatus of claim 1 wherein there is additionally included fourth means for coupling the chrominance component of said television signal for demodulation with said phase-adjusted oscillatory signal to produce said color difference signals, and wherein fifth means is also included to respond to corresponding coupling of said longer duration color reference signal to control the amplitude of said color difference signals and the saturation of the reproduced color image as a function of the amplitude of said reference signal.]

3. [The apparatus of claim 1] *In a color television receiver adapted to receive a television signal including a luminance component, a chrominance component modulated in both phase and amplitude, periodically recurring color synchronizing bursts occupying prescribed intervals during the horizontal retrace portions of said signal and a color reference signal occupying a prescribed interval during the vertical retrace portion of said television signal and being of substantially longer duration than said color synchronizing bursts, apparatus comprising:*

*first means for providing an oscillatory signal to demodulate said chrominance component, said means being responsive to the television signal for recovering the color synchronizing bursts thereof and for utilizing said bursts to lock the frequency of the oscillatory signal to the frequency of such bursts and to lock the phase of the oscillatory signal to the phase of said bursts;*

*second means, including at least first and second chrominance demodulators responsive to said oscillatory signal, and also responsive to said television signal, for demodulating said chrominance component and producing color difference signal outputs representative of the hue and saturation of the televised scene;*

*third means, also responsive to said television signal for recovering said longer duration color reference signal and for utilizing said signal in developing a control signal to adjust the phase of said oscillatory signal as a function of the phase of said reference signal;*

*fourth means responsive to said oscillatory signal and to said control signal for varying the phase of said oscillatory signal in a direction to correspond with the phase of said reference signal as represented by said control signal, said fourth means comprising a variable phase shifter, external to said first means, and interposed between an output of said first means and said demodulators;*

*and fifth means coupled to said third means for providing a DC correction signal to alter the control signal to which said fourth means responds, with said correction signal being controllable to adjust the hue of a reproduced color image in accordance with individual viewing preference;*

*whereby the degree of error in the hue of a reproduced color image attributable to such transmission characteristics as multipath, transmission line reflection and the like is correspondingly reduced;* wherein there is additionally included [fourth] *sixth* means for coupling the chrominance component of said television signal for demodulation with said phase-adjusted oscillatory signal to produce said color difference signals, and wherein [fifth] *seventh* means is also included to respond to [corresponding coupling of] said longer duration color reference signal and said color synchronizing bursts *to vary the gain of said sixth means* to control the amplitude of said color difference signals and the saturation of the reproduced color image as a function of the amplitude of said reference signal.

4. The apparatus of claim 1 wherein said [second] *third* means includes a phase comparator coupled to compare the phase of the oscillatory signal provided by said first means with the phase of said recovered longer duration color reference signals, and for providing said control signal as being representative of the degree to which the phase of said oscillatory signal differs from the phase of said reference signal.

5. The apparatus of claim 1 wherein said third means includes an amplifier coupled to receive said color difference signals *produced by one of said demodulators* and gated during the prescribed interval during the vertical retrace portion of the television signal in which said longer duration color reference signal is inserted, for developing said control signal for adjusting the phase of the oscillatory signal provided by said first means as being representative of the amplitude of said color difference signals during said prescribed interval.

6. The apparatus of claim 1 wherein there is additionally included [fourth] *seventh* means coupled to said [second] *third* means for providing a *direct current* correction signal to alter [the] *said* control signal, *said seventh means comprising a source of direct current and a potentiometer coupled thereto, said potentiometer having an adjustable tap, with adjustment of said tap varying the magnitude of said direct current correction signal to control the alteration of said control voltage and thereby the phase shift imparted to said oscillatory signal by said interposed phase shifter* [representative of the phase difference between said oscillatory signal and said longer duration reference signal, with said correction signal being controlable to adjust the hue of a reproduced color image in accordance with individual viewing preference].

7. The apparatus of claim 1 for use in a color television receiver providing color difference signals along B-Y and R-Y demodulation axes and operative with a television signal including said longer duration color reference signal at —(B-Y) phase, wherein said [second] *third* means includes means for monitoring the amplitude of the color difference signals provided along said R-Y demodulation axis and to develop said control signal for said [third] *fourth* means to adjust the phase of said oscillatory signal to reduce the amplitude of said R-Y color difference signal *during the occurrence of said longer duration color reference signal* in a direction to automatically compensate for transmission characteristic changes as would adversely affect the hue of the reproduced color image.

8. The apparatus of claim 1 for use in a color television receiver providing color difference signals along R-Y and B-Y demodulation axes and operative with a television signal including said longer duration color reference signal at —(R-Y) phase, wherein said [second] *third* means includes means for monitoring the amplitude of the color difference signals provided along said B-Y demodulation axis and to develop said control signal for said [third] *fourth* means to adjust the phase of said oscillatory signal to reduce the amplitude of said B-Y color difference signal *during the occurrence of said longer duration color reference signal* in a direction to automatically compensate for transmission characteristic changes as would adversely affect the hue of the reproduced color image.

*9. In a color television receiver adapted to receive a television signal including a luminance component, a chrominance component modulated in both phase and amplitude, periodically recurring color synchronizing bursts occupying prescribed intervals during the horizontal retrace portions of said signal and a color reference signal occupying a prescribed interval during the vertical retrace portion of said television signal and being of substantially longer duration than said color synchronizing bursts, apparatus comprising:*

*first means for providing an oscillatory signal to demodulate said chrominance component, said means being responsive to the television signal for recovering the color synchronizing bursts thereof and for utilizing said bursts to lock the frequency of the oscillatory signal to the frequency of such bursts and to lock the phase of the oscillatory signal to the phase of said bursts;*

*second means, including at least first and second chrominance component demodulators responsive to said oscillatory signal, and also responsive to said television signal, for demodulating said chrominance component and producing color difference signal outputs representative of the hue and saturation of the televised scene;*

*third means, also responsive to said television signal, for recovering said longer duration color reference signal and for utilizing said signal in developing a control signal to adjust the phase of said oscillatory signal as a function of the phase of said reference signal;*

*fourth means responsive to said oscillatory signal and to said control signal for varying the phase of said oscillatory signal in a direction to correspond with the phase of said reference signal as represented by said control signal; and*

*fifth means for selectively altering the control signal to which said fourth means responds, said fifth means comprising means for utilizing a DC correction signal developed with independence of the phase of said reference signal to alter the control signal developed as a function of the phase of said reference signal, with said correction signal being controllable to adjust the hue of a reproduced color image,*

*whereby the degree of error in the hue of a reproduced color image attributable to such transmission characteristics as multipath, transmission line reflection and the like is correspondingly reduced.*

*10. In a color television receiver adapted to receive a television signal including a luminance component, a chrominance component modulated in both phase and amplitude, periodically recurring color synchronizing bursts occupying prescribed intervals during the horizontal retrace portions of said signal and a color reference signal occupying a prescribed interval during the vertical retrace portion of said television signal and being of substantially longer duration than said color synchronizing bursts, apparatus comprising:*

*first means for providing an oscillatory signal to demodulate said chrominance component, said means being responsive to the television signal for recovering the color synchronizing bursts thereof and for utilizing said bursts to lock the frequency of the oscillatory signal to the frequency of such bursts and to lock the phase of the oscillatory signal to the phase of said bursts, said first means including a reference oscillator synchronized in frequency and phase by said bursts;*

*second means, including at least first and second chrominance component demodulators responsive to said oscillatory signal, and also responsive to said television signal, for demodulating said chrominance component and producing color difference signal outputs representative of the hue and saturation of the televised scene;*

*third means, also responsive to said television signal, for recovering said longer duration color reference signal and for utilizing said signal in developing a control signal to adjust the phase of said oscillatory signal as a function of the phase of said reference signal;*

*said third means comprising means for sensing the output of one of said demodulators during the occurrence of said reference signal and deriving a control voltage therefrom;*

*fourth means responsive to said oscillatory signal and to said control signal for varying the phase of said oscillatory signal in a direction to correspond with the phase of said reference signal as represented by said control signal;*

*said fourth means comprising a variable phase shifter, external to said oscillator, and interposed between an output of said oscillator and said demodulators;*

*fifth means for coupling the chrominance component of said television signal to said demodulators for demodulation with said phase-adjusted oscillatory signal to produce color difference signals, said fifth means also effecting a coupling of said reference signal to said demodulators; and*

*sixth means responsive to said longer duration color reference signals and said color synchronizing bursts for varying the gain of said fifth means to control the amplitude of the color difference signals and the saturation of the reproduced image as a function of the amplitude of said reference signals and said synchronizing bursts.*

*11. In a color television receiver adapted to receive a television signal including a luminance component, a chrominance component modulated in both phase and amplitude, periodically recurring color synchronizing bursts occupying prescribed intervals during the horizontal retrace portions of said signal and a color reference signal occupying a prescribed interval during the vertical retrace portion of said television signal, said reference signal being of substantially longer duration than said color synchronizing bursts, apparatus comprising:*

*first means for providing an oscillatory signal to demodulate said chrominance component and produce color difference signals containing information proportional to the hue and saturation of the televised scene, said means being responsive to the television signal for recovering the color synchronizing bursts thereof and for utilizing said bursts to lock the frequency of the oscillatory signal to the frequency of said bursts and to lock the phase of the oscillatory signal to the phase of said bursts;*

*said first means including a reference oscillator synchronized in frequency and phase by said bursts;*

*second means, including at least first and second chrominance component demodulators responsive to said oscillatory signal, and also responsive to said television signal, for demodulating said chrominance component and producing color-difference signal outputs representative of the hue and saturation of the televised scene;*

*third means, also responsive to said television signal, for recovering said longer duration color reference signal and for utilizing said signal in developing a control signal to adjust the phase of said oscillatory signal as a function of the phase of said reference signal;*

*fourth means responsive to said oscillatory signal and to said control signal for varying the phase of said oscillatory signal in a direction to correspond with the phase of said reference signal as represented by said control signal;*

*said fourth means comprising a variable phase shifter, external to said oscillator, and interposed between an output of said oscillator and said demodulators;*

*fifth means for coupling the chrominance component of said television signal for demodulation with said phase-adjusted oscillatory signal to produce said color difference signals;*

*sixth means responsive to said longer duration color reference signal and said color synchronizing bursts for varying the gain of said fifth means to control the amplitude of said color difference signals and the saturation of the reproduced color image as a function of the amplitude of said reference signal; and*

*seventh means for selectively altering the control signal to which said fourth means responds, said seventh means comprising eighth means, including a source of direct current and a potentiometer coupled thereto, said potentiometer having an adjustable tap, for developing a DC correction voltage with independence of the phase of said reference signal; and*

*ninth means for utilizing said DC correction voltage to alter the control voltage developed by said third means, with the magnitude of said DC correction voltage varying in response to adjustment of said tap to adjust the hue of a reproduced color image in accordance with individual viewer preference;*

*whereby the degree of error in the hue of a reproduced color image attributable to such transmission characteristics as multipath, transmission line reflection and the like is correspondingly reduced.*

*12. In a color television receiver adapted to receive a television signal including a luminance component, a chrominance component modulated in both phase and amplitude, periodically, recurring color synchronizing bursts occupying prescribed intervals during the horizontal retrace portions of said signal and a color reference signal occupying a prescribed interval during the vertical retrace portion of said television signal, said reference signal being of substantially longer duration than said color synchronizing bursts, apparatus comprising:*

*first means for providing an oscillatory signal to demodulate said chrominance component and produce color difference signals containing information proportional to the hue and saturation of the televised scene, said means being responsive to the television signal for recovering the color synchronizing bursts thereof and for utilizing said bursts to lock the frequency of the oscillatory signal to the frequency of said bursts and to lock the phase of the oscillatory signal to the phase of said bursts;*

*second means, also responsive to said television signal, for recovering said longer duration color reference signal and for utilizing said signal in developing a control signal to adjust the phase of said oscillatory signal as a function of the phase of said reference signal;*

*third means responsive to said oscillatory signal and to said control signal for varying the phase of said oscillatory signal in a direction to correspond with the phase of said reference signal as represented by said control signal; and*

*fourth means coupled to said second means for providing a correction signal to alter the control signal representative of the phase difference between said oscillatory signal and said longer duration reference signal, with said correction signal being controllable to adjust the hue of a reproduced color image in accordance with individual viewing preference;*

*whereby the degree of error in the hue of a reproduced color image attributable to such transmission characteristics as multipath, transmission line reflection and the like is correspondingly reduced.*

* * * * *